United States Patent [19]

Heilweil

[11] Patent Number: 4,980,566
[45] Date of Patent: Dec. 25, 1990

[54] ULTRASHORT PULSE MULTICHANNEL INFRARED SPECTROMETER APPARATUS AND METHOD FOR OBTAINING ULTRAFAST TIME RESOLUTION SPECTRAL DATA

[75] Inventor: Edwin J. Heilweil, Rockville, Md.

[73] Assignee: The United States of America as represented by the Secretary of Commerce, Washington, D.C.

[21] Appl. No.: 388,420

[22] Filed: Aug. 2, 1989

[51] Int. Cl.$^5$ .................................................. G01J 3/42
[52] U.S. Cl. .................................... 250/339; 250/338.1
[58] Field of Search .................. 250/338.1, 339, 338.5, 250/341

[56] References Cited

PUBLICATIONS

E. J. Heilweil, R. R. Cavanagh and J. C. Stephenson, "Population Relaxation of CO(v=1) Vibrations in Solution Phase Metal Carbonyl Complexes", *Chem. Phys. Lett.*, vols. 134, No. 2, Feb. 19, 1987, pp. 181–188.

T. M. Jedju, I. Rothberg, and A. Labrie, "Sub-picosecond Time-Resolved Spectroscopy by Transient Infrared Absorption", Optics Letters, 13(11), Nov. 1988.

D. S. Moore and S. C. Schmidt, "Tunable Sub-picosecond Infrared Pulse Generation to 45 um", Optics Letters, vol. 2, No. 7, Jul. 1987.

E. J. Heilweil, "Ultrashort-Pulse Multichannel Infrared Spectroscopy Using Broadband Frequency Conversion in LiIO$_3$", Optics Letters, Jun. 1, 1989.

*Primary Examiner*—Carolyn E. Fields
*Attorney, Agent, or Firm*—Thomas Zack; Alvin J. Englert; Chittaranjan N. Nirmel

[57] ABSTRACT

A simple, compact optical spectrometer employs solid-state nonlinear crystals for obtaining broadband multichannel infrared spectra with picosecond or femtosecond time resolution. Spectrally broad infrared pulses are produced by difference frequency mixing in a first LiIO$_3$ crystal between the second harmonic of a picosecond Nd$^{+3}$:YAG laser and broadband output of a synchronously pumped dye laser, and a resultant broadband IR pulse is upconverted by a second LiIO$_3$ crystal to yield a blue visible pulse which is dispersed by a 0.25 meter spectrograph onto a multichannel vidicon or reticon detector to obtain four wavenumber resolution single-shot transient infrared spectra of a sample. The present invention enables rapid acquisition of ultrashort time infrared spectra over a broadly tunable spectral range (in the mid to near infrared) at minimal cost and by a simple but versatile optical system employing readily available components.

20 Claims, 5 Drawing Sheets

ULTRASHORT PULSE MULTICHANNEL INFRARED SPECTROMETER APPARATUS AND METHOD FOR OBTAINING ULTRAFAST TIME RESOLUTION SPECTRAL DATA

FIELD OF THE INVENTION

This invention relates to a multichannel infrared spectrometer and a method for obtaining infrared spectra, and, more particularly, to a multichannel infrared spectrometer and method that provides spectral data with picosecond or femtosecond time resolution.

BACKGROUND OF THE INVENTION

Chemical reactions proceed from the initial reactants to the final products though various intermediates, and a proper understanding of such short-lived intermediates is highly desirable in many applications. In order to directly observe ultrafast transient processes such as chemical reaction intermediates and energy transfer in molecular, semiconductor and other systems, it is desirable to obtain broadband optical spectra in the low energy, e.g., 1.5 to 15 micron infrared, region of the spectrum. Picosecond or femtosecond pulsed lasers are available to initiate such an energetic process, followed by a measurement of the resulting transient changes in the optical properties of the system as a function of time.

Broadband visible probe pulse detection for observing transient energy transfer, molecular rearrangement and other chemical and physical processes has been accomplished in the past through the use of conventional spectrographs and optical multichannel analyzer (OMA) detectors. Intensified vidicons (ISIT) or linear array reticon detectors are extremely sensitive, approaching single visible photon detectability, and have sufficiently close-spaced pixels to obtain relatively high spectral resolution. Such detection schemes have been used to obtain molecular transient adsorption spectra directly in the optically visible range by picosecond or femtosecond continuum pulse generation. B. I. Greene, R. M Hochstrasser, and R. B. Weisman, J. Chem. Phys., 70, 1247 (1979); C. V. Schank, R. L. Fork, C. H. Brito Cruz, and W. Knox, in "Ultrafast Phenomena V", G. R. Fleming and A. E. Siegman, eds. (Springer-Verlag, N.Y. 1986), pp. 179–181.

Because of the lack of suitable multichannel IR detectors, measurements of transient adsorption spectra in the mid-infrared, i.e., from 1000 to 4000 $cm^{-1}$, has involved reliance on scanning an independently tunable narrowband probe pulse, H. Graener, R. Dohlus, and A. Laubereau, in the Proceedings of Ultrafast Phenomena VI Conference, Kyoto Japan, July 1988, pp. 304; Chem. Phys. Lett., 140, 306 (1987), nonlinear frequency upconversion of an independently tunable diode laser, J. N. Moore, P. A. Hansen, and R. M. Hochstrasser, Chem. Phys. Lett., 138, 110 (1987), or the shifting of a nanosecond broadband dye laser into the infrared and then frequency shifting back into the visible for OMA detection. D. S. Bethune, A. J. Schell-Sorokin, J. R. Lankard, M. M. T. Loy, and P. P. Sorokin, in "Advances in Laser Spectroscopy", B. A. Garetz and J. R. Lombardi, eds. (Wiley, N.Y. 1983), Vol. 2. The latter method employs stimulated electronic Raman scattering in cesium or rubidium heat pipes and has recently been applied to picosecond and shorter time-domain experiments. J. H. Glownia, J. Misewich and P. P. Sorokin, Opt. Lett., 12, 19 (1987); Chem. Phys. Lett., 139, 491 (1987); M. Berg., A. L. Harris, J. K. Brown, and C. B. Harris, Opt. Lett., 9. 50 (1984). Prior approaches to this type of spectroscopy have involved scanning a narrow band IR probe laser with signal averaging to obtain a "point by point" spectrum of the ultrafast optical transient. In a similar fashion, a narrowband tunable continuous wave diode laser is upconverted at high repetition rate by an ultrashort pulsed laser to obtain the IR spectrum while scanning the diode laser throughout the infrared.

Previously applied technology of the type broadly related to the present invention involves shifting broadband visible dye lasers or ultrashort continuum in hazardous and highly inefficient metal vapor ovens into the infrared. Using this prior approach, the broadband infrared is then passed through a sample and thereafter upconverted back into the visible by a second metal vapor cell. The latter method has been successful only for long duration pulsed applications (nanosecond) and in a very limited spectral range (2.0 to 2.5 microns) when using femtosecond pulses. This method also requires elaborate technology to work in common laboratory environments.

There is, therefore, a need for a simple, compact spectrometer based on commercially available lasers, optics, spectrographs, and visible multichannel detectors to efficiently produce broadband IR and upconverted single-shot transient IR spectra.

DISCLOSURE OF THE INVENTION

Accordingly, it is an object of this invention to provide apparatus and a method for obtaining broadband multi-channel infrared spectra pertaining to a sample, with picosecond or femtosecond time resolution.

A further object of this invention is to provide apparatus and a method for utilizing an optically visible, ultrashort broadband pulse output from a laser shifted into the infrared region for sample probing and then back into the visible spectrum for multichannel detection of data characterizing a condition of the sample with very high spectral resolution.

A further object of this invention is to provide apparatus and a method to obtain by single shot probing of a sample by a pulsed laser an entire spectral region of the sample and, by repeating such probing and averaging thereof, to obtain precise time-resolved spectral data of the sample.

These and other objects of the present invention are realized in a preferred embodiment by apparatus which comprises means for generating a visible pulse at a predetermined narrowband high-pulse frequency; means for amplifying said optical pulse and generating a corresponding amplified output; means for receiving a portion of said amplified output and generating a corresponding visible tunable broadband single pulse output; means for orthogonally polarizing and collimating said narrowband pulse and said broadband pulse to generate a broadband infrared (BBIR) probing pulse; means for beamsplitting said BBIR probing pulse into a horizontally polarized infrared output and a visible pulsed output; means for transmitting said horizontally polarized infrared output to a sample to thereby obtain a broadband infrared signal characterized by said sample; and means for overlapping said characterized signal with said visible pulse output to generate a visible spectral signal providing broadband data of said probed sample.

DESCRIPTION OF THE PREFERRED EMBODIMENTS

Figure 1A:
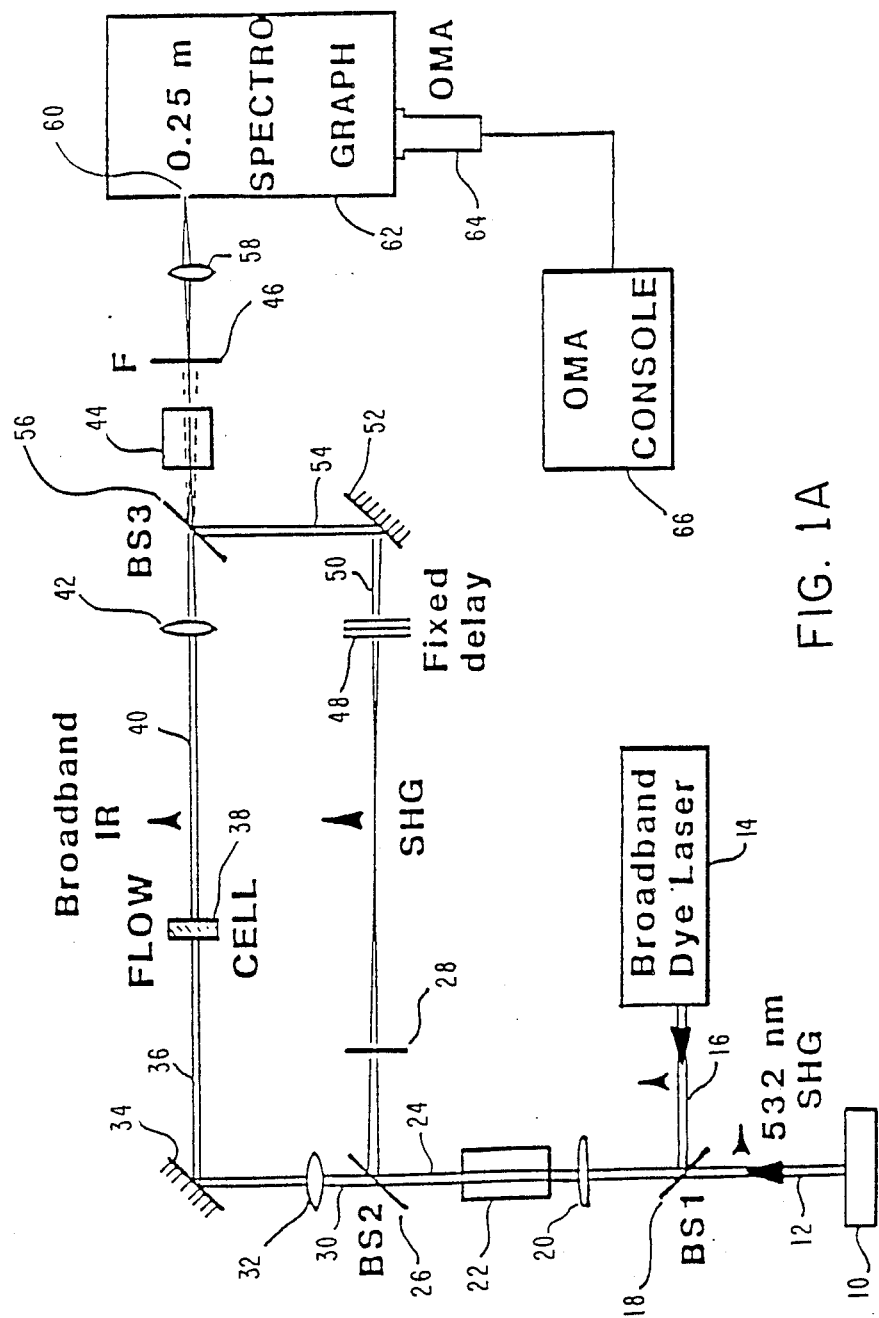
FIG. 1A is a schematic illustration of the apparatus of this invention according to a preferred embodiment in which a probing pulse is transmitted through a sample.

The preferred embodiment of the apparatus of this invention includes a picosecond $Nd^{+3}$:YAG laser-based system 10. Depending on the application at hand, e.g., one requiring ultrafast resolution in the femtosecond regime, the user could readily use any known femtosecond laser as described elsewhere hereinafter. Briefly, such an exemplary system comprises a 10 Hz flashlamp pumped active-passively modelocked linear cavity, a Pockels cell pulse extractor, and several YAG amplifiers. The internal details of the structure are not illustrated as they are of a well-known type. E. J. Heilweil, R. R. Cavanagh, and J. C. Stephenson, Chem. Phys. Lett., 134, 181 (1987); J. Phys. Chem., 92, 6099 (1988); J. Chem. Phys., 89, 5342 (1988). This article was coauthored by the present inventor and describes pertinent structural details of the individual components, and is hereby incorporated herein by reference particularly for such details.

Basically, as best understood with reference to FIG. 1 hereof, a 1.06 $\mu M$ oscillator pulse train, comprising a sequence of pulses separated in time at 80 MHz, is generated by laser beam source 10 amplified to ca. 10 mJ, frequency doubled (SHG) to 532 nm in KDP (2 mJ train energy), and a portion thereof is used to synchronously pump a linear red dye laser oscillator 14. The dye laser cavity is composed of a 1 mm flowing dye cell and two visible broadband high reflectors (flat and 2 m concave dielectric mirrors and cavity dumper). Birefringent tuning plates and a thin etalon, described in detail in the Heilweil, et al. article cited in the preceding paragraph, are removed from the cavity so that the laser output bandwidth is determined by the dye gain profile.

Broadband single pulses 16 (25 ps FWHM, 15 $\mu J$/pulse, Rhodamine 640 in KOH/Ethanol) are cavity-dumped from the dye oscillator 14 by a polarizer and Pockels cell connected by a fixed length transmission line to a YAG pulse extractor krytron. The monochromator-scanned spectral output 16 of the dye laser, centered about 598 nm, is nearly flat-topped, has a 175 $cm^{-1}$ FWHM bandwidth and 350 $cm^{-1}$ width at its base.

Single pulses from the YAG oscillator are amplified to 12 mJ and frequency doubled in KDP (ca. 1mJ, 32 ps FWHM) to longitudinally pump a two-stage flow cell (Rhodamine 610/Ethanol) dye amplifier system. Final broadband amplified dye laser pulsed typically contain 150 $\mu J$ average energy (10% amplitude fluctuation) and retain the original oscillator pulse duration and spectral content. Fundamental light passing through a first KDP crystal is doubled in a second KDP crystal (SHG ca. 600 $\mu J$) for later broadband pulse down and upconversion steps. The benefit of this setup is zero pulse jitter (all pulses derived from the YAG oscillator), moderately high pulse energies for downstream nonlinear conversion and well-defined amplified dye and SHG $TEM_{oo}$ Gaussian beam profiles. The complete visible pulse optical arrangement within such a known laser is schematically shown, for example, in the Heilweil et al. articles cited in the Background of the Prior Art section above which are incorporated herein by reference.

After appropriate optical delay and spatial telescoping, the orthogonally polarized collimated and copropagating amplified broadband dye laser and SHG pulses 12 and 16 are combined on dielectric beamsplitter BS1 18 after passage through an antireflection coated, preferably 50 cm., lens 20 disposed as best seen in FIG. 1. Beam diameters of 6 mm were chosen in experimental development of this invention to avoid excessive power density ($<100$ MW/$cm^2$) in a horizontally tuned $LiIO_3$ downconversion crystal 22 (Type I, 3 cm long $LiIO_3$ crystal cut at 21°). C. A. Moore and L. S. Goldberg, Opt. Comm., 16, 21 (1976).

Figure 2:
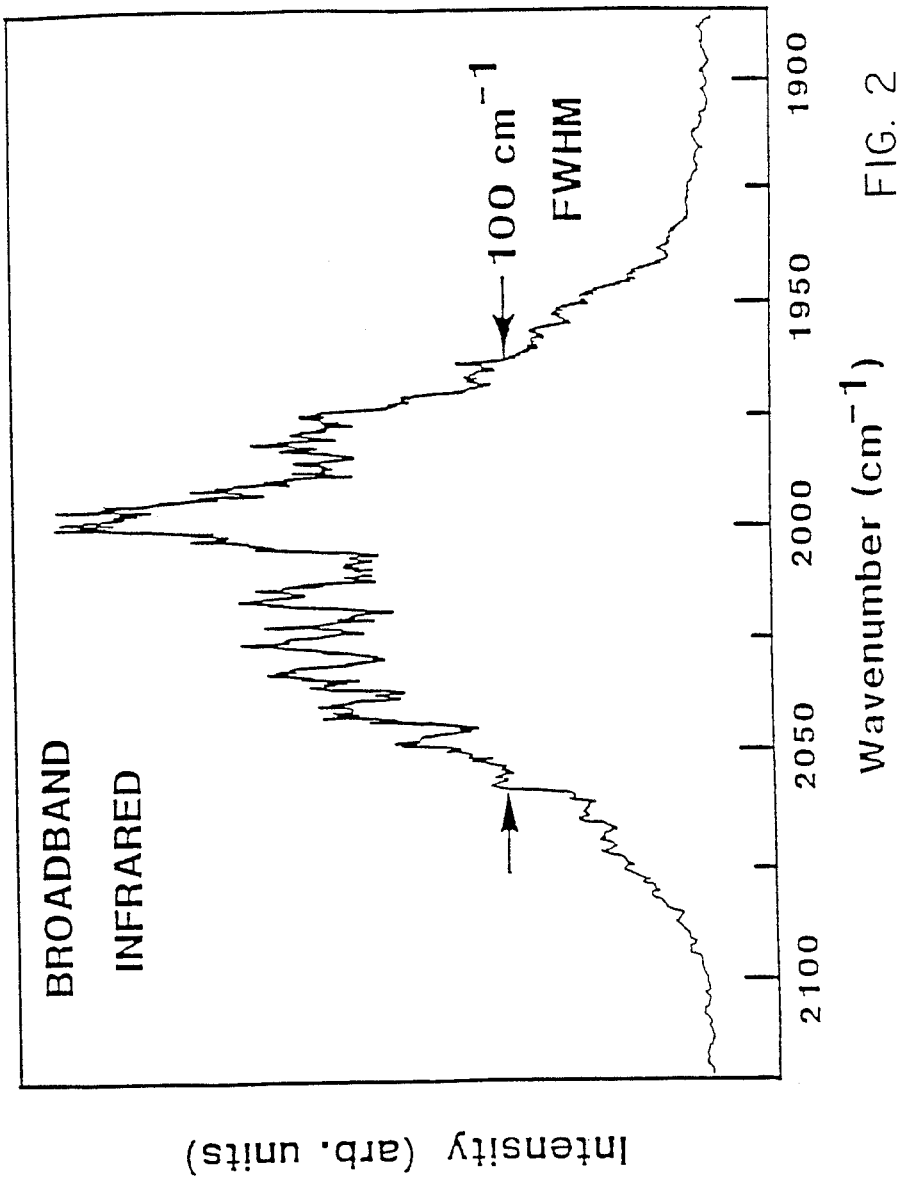
FIG. 2 is a broadband infrared output, plotted as intensity vs. wavenumber, experimentally obtained with apparatus and the method of this invention.

Lens 20 placed before downconverter 22, with such exemplary components and experimental geometry, produced a beam with 0.7 degree angle of convergence. This geometry is believed to be well adapted to span the narrow 1.5 degree cone of external angles necessary for phase matching in downconverter 22 to produce a 100 $cm^{-1}$ FWHM broadband IR pulse centered at ca. 2050 $cm^{-1}$ (4.8 microns) by difference frequency generation (e-o→ 0). L. S. Goldberg, Appl. Opt., 14, 653 (1975). Replacing the 50 cm lens 20 with one of 1 m focal length, for example, would yield 50 $cm^{-1}$ FWHM output. This is best understood with reference to FIG. 2.

A horizontally polarized IR pulse 24 is beamsplit from the visible pulses after downconverter 22, preferably by a 1 inch diameter, 1mm thick polished silicon wafer BS2 26, flat 60% transmission at 5 microns, ca. 40% reflection at 532 nm, and contains about 1 $\mu J$ total energy (measured with a pyroelectric detector). The generation efficiency of a 1 $\mu J$ broadband IR pulse corresponds to a 0.5% dye laser pulse energy conversion or 4.2% photon conversion. For the IR output pulse spectrum illustrated in FIG. 2, the 100 $cm^{-1}$ FWHM bandwidth corresponds to approximately 10 nJ of energy per wavenumber. It is assumed the broadband IR pulse duration is the same as that measured (18 ps FWHM) when a narrowband (6 cm.−1 FWHM) dye laser is used in the downconversion process.

The broadband IR pulse 30 emerges from downconverter 22, as transmitted through wafer 26, as an expanding ellipsoid with spatially dispersed colors in the vertical plane. It has been determined that a 20 cm $CaF_2$ lens 32 placed 20 cm after the downconverter 22 collimates the output beam (0.8 by 0.5 cm) over a 2 meter pathlength and it can be tightly focused (10 cm $CaF_2$ lens) to a spot of diameter 300 microns or less. This propagation condition is required for using such pulses in all future broadband IR probing applications.

As shown in FIG. 1A, after reflection at a mirror 34, the broadband IR pulse 36 passes through a flow cell 38 (1 mm pathlength with two sapphire windows) in which an IR absorber sample solution can be placed.

Figure 1B:
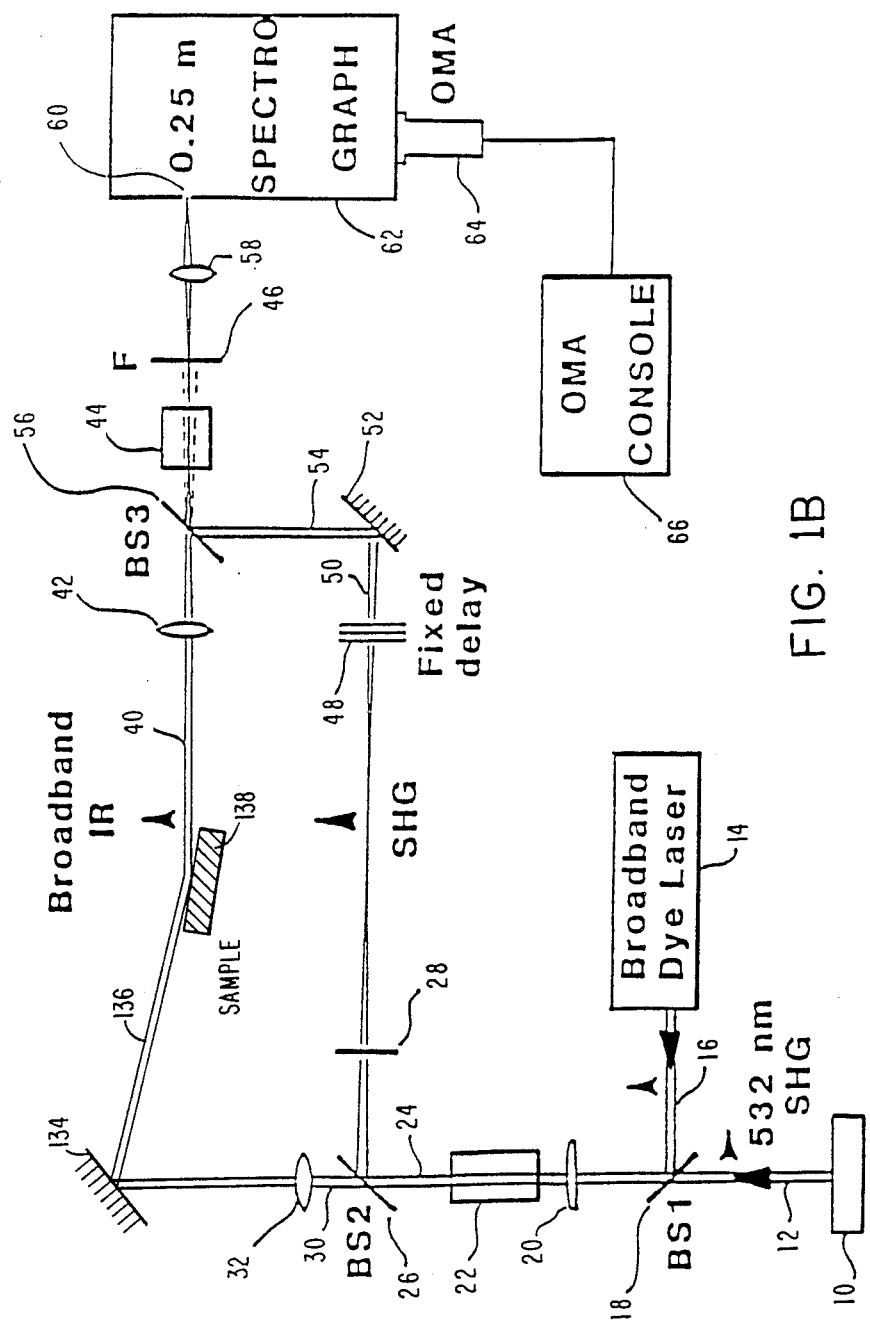
FIG. 1B is a schematic illustration of an apparatus of this invention in which a probing a pulse is reflected from a sample.

This sample solution, in an exemplary application as just described, contains the substances of interest and under study. Alternative examples will occur to persons skilled in the spectrographic arts, e.g., directing excitation or pump and broadband probing laser pulses 136 at a surface of a solid sample 138, with the pulses being reflected from the sample, as shown in FIG. 1B.

After traversing the flow cell 38, the BBIR pulse 40 (containing sample absorption information) is focused by a 20 cm focal length $CaF_2$ lens 42 into a $LiIO_3$ Type I converter 44 (1.5 cm long cut at 21°). Upconverter 44 is placed about one meter from the downconverter 22 so that the SHG pulse, which focuses halfway between the crystals 22 and 44, has the same angle of divergence and diameter as when it emerged from downconverter 22. In such a compact symmetric rectangular configuration wherein the $\lambda/2$ polarizing waveplate 28 rotates the SHG pulses 24 to horizontal polarization, an assembly 48 containing several thicknesses of glass is used to compensate for optical delay occasioned in passage of the IR pulse 40 through the $CaF_2$ lenses 32 and 42 and the sample cell 38. The delayed SHG pulses 54 are reflected, as needed, by a mirror 52. The result is that both the lightly focused broadband IR pulse 40 and the pulse 50, reflected at a mirror 52 to become the pulse 54 are overlapped after a silicon beam-combiner BS3 56, and thereafter propagate with horizontal polarization through the upconverter 44.

The upconverter 44 serves as a linear sum frequency generator by mixing the focused broadband IR pulse 40 with the intense (ca. 100 $\mu$J) SHG pulse 54. For proper beam sizes and divergences, the broadband IR pulse 40, also sometimes referred to as the probe pulse, is efficiently shifted back into the visible spectral region for photomultiplier or OMA detection. Such an approach has previously been used for upconverting narrowband IR pulses, H. J. Hartman and A. Laubereau, Appl. Opt., 20, 4259 (1981), picosecond gating of broad molecular fluorescence, for example in K. J. Choi, B. P. Bozcar, and M. R. Topp, Chem. Phys., 57, 415 (1981) and in R. Moore, F. E. Doany, E. J. Heilweil, and R. M. Hochstrasser, J. Phys. Chem., 88, 876 (1984), and recently to gate a narrowband CW IR diode laser. See, for example, Moore, et al., cited earlier.

In the preferred embodiment of the type studied experimentally, the broadband IR probe pulse 40 with imposed sample absorption is shifted to ca. 480 nm so single shot spectra can be obtained. After filtering the SHG and dye laser pulses 54 and 40 with a 3-cavity 480 nm bandpass filter 46, the upconverted blue pulse is visible to the eye and is readily focused, preferably by a 10 cm lens 58, onto the entrance slit 60 of a spectrograph 62. The resulting pulse is spectrally dispersed by a 0.25 m single monochromator (25 micron entrance slit, 1200 groove/mm grating in second order) onto the face of an OMA detector 64 at the exit focal plane of spectrograph 62. The final spectrum exhibits a vertical shift on the OMA detector 64 arising from vertical spectral displacement. A visual display is conveniently presented at the OMA console 66 in known manner and may, likewise, be recorded or processed in any convenient form and format.

In experimental studies with apparatus of the type just described, the upconversion efficiency was not measured (estimated as 6 nJ from OMA counts or 0.5% IR energy conversion), but the blue pulse energy was attenuated by three orders of magnitude to avoid OMA intensifier saturation and detector channel cross-talk.

Figure 3B:
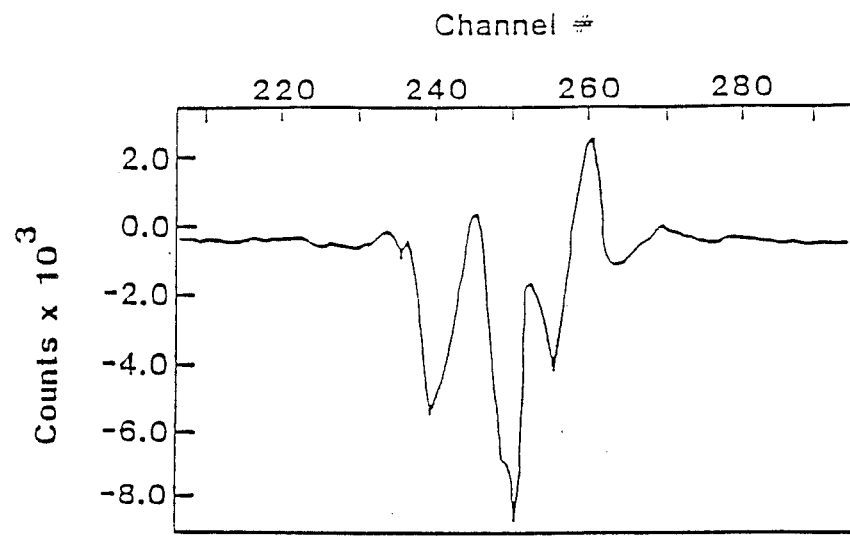
FIG. 3(b) is a plot of the result of subtracting two upconverted spectra taken under identical acquisition conditions.
Figure 3A:
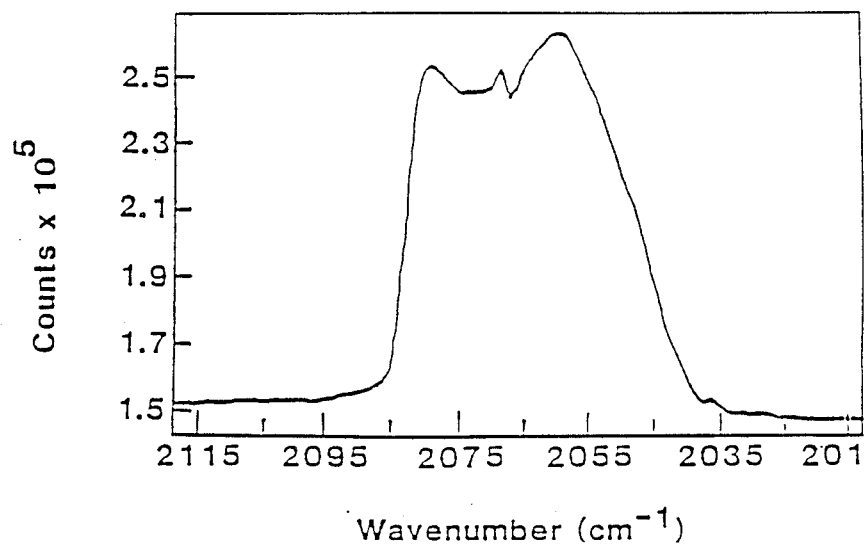
FIG. 3(a) is a plot of the average of 600 samples of single shot upconverted data obtained with apparatus and the method of this invention.
Figure 4:
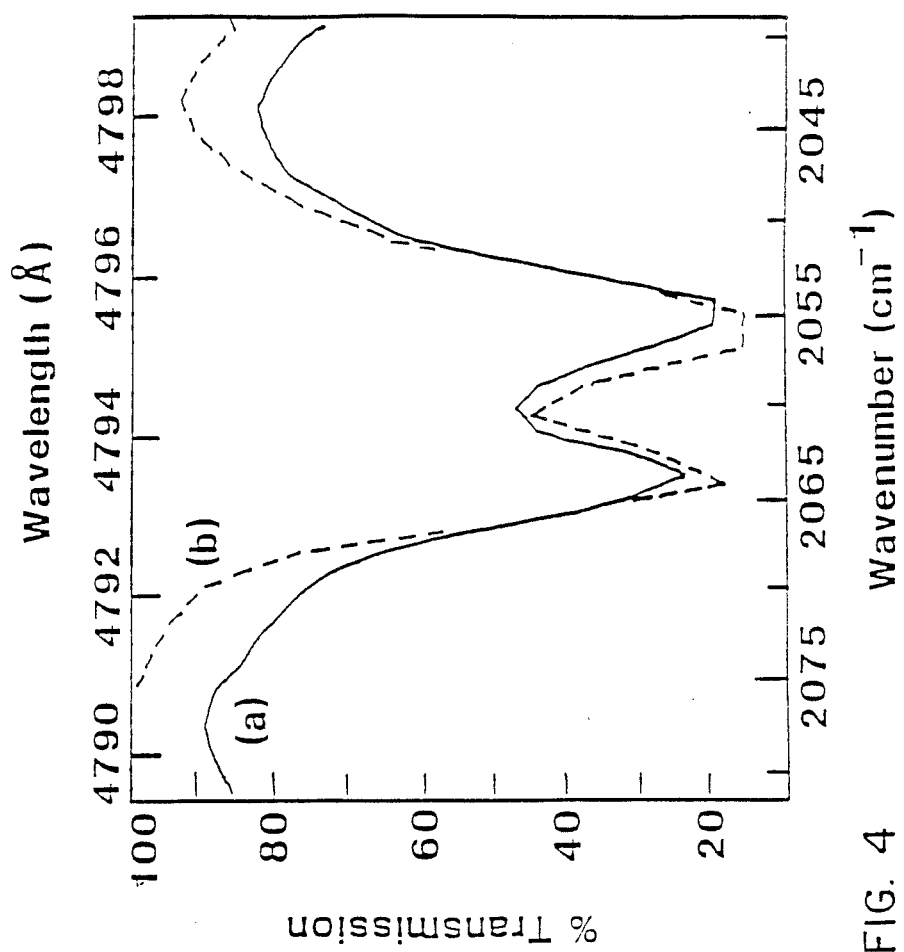
FIG. 4 is a graphical presentation for comparison of data plots (a) of a picosecond spectrum obtained by the apparatus and of this invention and (b) data of the same sample obtained by another known apparatus.

Examples of upconverted spectra, usable spectral width, overall system resolution, and averaged spectral lower limit detectability (S/N) are illustrated in FIGS. 3 and 4. Single laser shot upconverted spectra (observed during real-time alignment) contain marked intensity spikes (limited to <2000 counts/channel) which fluctuate from shot to shot. However, after averaging 10 or more shots, the spikes rapidly smooth out and converge to the final upconverted spectrum shown in FIG. 3(a).

Such an averaging step, utilizing digitized data stored as sequences of data acquisition in well-known manner is included in the overall processing of the data to generate a useful output. The spectrum of FIG. 3(a), obtained by averaging 600 laser shots (free-running the OMA system for one minute) exhibits a smooth profile with a 36 $cm^{-1}$ FWHM bandwidth and 54 $cm^{-1}$ full width at the base. Surprisingly, the result of subtracting two upconverted spectra (taken under identical acquisition conditions), shows an rms noise deviation of about 1% of the individual averaged peak counts (FIG. 3(b)). Very small changes in absorption (on the percent level or less) are detectable by this approach.

Very briefly, the present invention could readily utilize any available picosecond or femtosecond dye laser oscillator, e.g., a CW $Ar^+$-pumped CPM dye laser or CW YAG pumped dye lasers. These lasers are typically used to generate high power picosecond or femtosecond visible pulses after appropriate forms of amplification such as multi-stage dye or YAG/glass amplification. Two pulses with sub-millijoule energy are generated by these lasers, one at a fixed narrow frequency and the other from a tunable broadband dye laser containing no spectral narrowing components. These pulses are then frequency mixed by nonlinear crystals to spectrally shift the broadband dye laser into the infrared for sample probing, and then back into the visible for multichannel detection.

The visible pulses are orthogonally polarized, temporally overlapped and matched by lenses to have substantially the same beam size. By appropriate choice of frequency separation between the pulses a suitably efficient Type I nonlinear crystal (e.g., $LiIO_3$, $LiNbO_3$, $AgGaS_2$) is employed as a downconverter to generate a new broadband infrared (BBIR) probing pulse by difference frequency mixing. The crystal must, of course, be transparent in the IR region of interest in order to function properly. The input pulses are weakly focused into the downconverting crystal in order to satisfy phase-matching conditions over the entire bandwidth of the broadband dye laser pulse. The broadband infrared pulse generated by this approach can be used as a short-pulse IR probe of optical changes in a sample. As persons skilled in the art will appreciate, it is not essential that the sample be probed by transmission of the probing pulse therethrough. Reflection of the probing pulse off a sample and collection of the reflected pulse (now characterized by the sample) in known manner may be utilized as well. Hence data can be generated by the apparatus and method of this invention by transmission or reflection. These changes are induced by another optical pulse of appropriate frequency (generated by the same laser system) and made to arrive at the sample prior to the BBIR probing pulse.

Thus, in a single shot of the laser, an entire spectral region of the sample may be probed at a fixed delay time after the arrival of the initiating or pumping laser pulse. Multiple shots may then be obtained and averaged to improve the spectral signal to noise ratio, and the timing between the initiating and BBIR probe pulses may be altered to obtain a complete temporal and spectral map of the sample optical changes as a function of time.

To experimentally demonstrate the system detection linearity and resolution, a solution of $Co_4(CO)_{12}$ in n-hexane solvent was used, as described in full detail in E. J. Heilweil, R. R. Cavanagh, and J. C. Stephenson, J. Chem. Phys., 89, 230 (1988). This sample material exhibits two extremely sharp CO-stretching absorption features at 2055.0 and 2063.5 $cm^{-1}$ with bandwidths of ca. 2.5 and 2.0 $cm^{-1}$ FWHM, respectively, at 0.5 $cm^{-1}$ resolution. With the flow cell rigidly fixed, a broadband spectrum was obtained with only solvent in the cell 38. A second spectrum was taken under identical conditions after flowing the metal-carbonyl solution into the cell. Substitution or misalignment of the sample cell introduced spectral distortions since the unfocused IR pulse is spectrally inhomogeneous. After subtracting off dark counts from the two spectra and dividing the resultant sample spectrum (I) by the solvent spectrum ($I_o$), the molecule transmission spectrum ($T=I/I_o$) of FIG. 4(a) is obtained. The remarkable similarity between the picosecond spectrum of FIG. 4(a) and a static FTIR spectrum (as manufactured, for example, by Analect Instruments) of the same sample at 4 $cm^{-1}$ FWHM resolution, FIG. 4(b), is readily apparent. Both absorption features exhibit nearly identical transmission depths and the channel resolution, bandwidths and spectral shapes are well reproduced.

It has thus been established experimentally that the optical system as described hereinabove is capable of obtaining ca. 20 picosecond time-resolved infrared transient spectra with 4 $cm^{-1}$ FWHM spectral resolution and absorption sensitivity of a few percent. A transient spectrum is collected in a matter of minutes for fixed pump and probe delay. While the upconverted spectra shown in FIGS. 3 and 4 span ca. 50 $cm^{-1}$, optimization of the upconverter (see FIG. 1) has more recently approached the full IR pulse bandwidth of 100 $cm^{-1}$ FWHM. It is anticipated that by careful choice of dye, dye concentration, dye mixtures and optical configuration, it should be possible to tune the IR central frequency and broaden the IR pulse spectrum to encompass a particular infrared spectral window of interest. IR segments spanning ca. 1800–4000 $cm^{-1}$ should be accessible by this method since $LiIO_3$ is transparent there and the phase-matching angle vs. frequency curve is nearly flat, giving sufficient angular acceptance to reach this entire frequency region. See, for example, Moore et al., and Goldberg, supra.

Spectral resolution and the signal-to-noise ratio should be further improved by employing a more dispersive spectrograph and dividing two spectral tracks (an unexcited spectrum, the other excited) on a shot by shot basis. Furthermore, this method should also transpose to the femtosecond pulse regime when employed with a fixed frequency mixing pulse and broadband dye laser that are of sufficient energies and beam quality to phase-match in an appropriate length (<1 mm) of the $LiIO_3$ converter. T. M. Jedju, L. Rothberg, and A. Labrie, Opt. Lett., 13, 961 (1988). The probing method described herein with respect to the present invention is applicable to a wide range of applications involving broadband transient IR spectroscopies and is well-adapted to enable study of vibrational population dynamics and related photochemical processes in chemical systems.

There are several new and simplifying advantages of the present invention including, for example, the following:

(1) The single most important distinguishing aspect of this invention is that in a matter of minutes, transient IR spectra with very high temporal and spectral resolution can be obtained. Other known methods require elaborate wavelength scanning, walk-off compensation, and many hours to collect a single spectrum at fixed time delay. The ability to acquire many transient IR spectra over a broad spectral range and over many time increments increases a user's ability to comprehend detailed spectroscopic and mechanistic changes occurring in a sample over extremely short (picosecond or less) time duration. The invention would rival the cost and availability of known Fourier Transform Infrared (FTIR) instruments which can measure transient IR spectra only on the microsecond or longer timescale.

(2) Readily available optical components and solid-state nonlinear conversion crystals are employed for frequency shifting. By using crystals instead of high temperature metal vapor ovens, dangerous environmental hazards are eliminated and high energy conversion efficiencies are realized.

(3) Compact optical design and easy alignment make the invention useful for broad ranges of applications and appropriate for commercialization. Previous prior art requires elaborate optics and extensive bench space.

(4) A single crystal type (e.g., $LiIO_3$) can be used from 1800 $cm^{-1}$ (5.6 microns) up to 4000 $cm^{-1}$ (1.6 microns) or higher frequencies. These crystals are readily available, compact, inexpensive, and make the invention appropriate over a wide range of probing wavelengths. If lower frequency regions are desired, the above crystals could be replaced by $AgGaS_2$ which will perform from 900 $cm^{-1}$ (11.11 microns) up to 1800 $cm^{-1}$. $LiIO_3$ can easily reach 1% or better energy conversion efficiency with appropriate optical design. Previous methods using metal vapor ovens are plagued with internal infrared absorption, limited usable wavelength range, and much lower energy conversion and efficiency.

(5) A 0.25 meter spectrograph with grating in second order and a reticon or vidicon detector is adequate for detecting the upconverted probe pulse. This optical arrangement provides 4 $cm^{-1}$ FWHM resolution or better. Prior art uses larger 0.75 meter spectrographs which give slightly higher resolution but again take up extensive bench space.

(6) The invention is usable for measurements in the picosecond and shorter (femtosecond) time regime. Other known or currently usable methods are adequate only for nanosecond or longer pulses for broadband and wide frequency range applications. This invention does not use continuum generation as a broadband source as in prior art. Continuum sources are undesirable because they degrade the BBIR conversion efficiency due to uncontrollable output beam spatial and large energy amplitude fluctuations.

(7) Use of appropriately chosen crystal lengths and femtosecond dye laser pulses will enable studies of ultrafast phenomena by broadband infrared spectroscopy in previously inaccessible IR spectral regions.

In another aspect of the present invention, a preferred embodiment of the method includes the steps of generating a visible pulse train at a predetermined narrowband high-pulse frequency; amplifying said optical pulse train and generating a corresponding single narrowband pulse and amplified output; receiving a portion of said amplified train output and generating a tunable visible broadband pulse output therefrom; orthogonally polarizing and collimating said single pulse and said broadband output to generate a focused broadband infrared (BBIR) probing pulse; downconverting and beamsplitting said probing pulse into a horizontally polarized infrared output and a visible pulsed output; passing said horizontally polarized infrared output through a sample and focusing a resultant corresponding broadband signal characterized by said sample; and overlapping said characterized infrared signal with said visible pulsed output to generate a visible spectral signal providing data on said probed sample.

Current and Potential Applications of the Present Invention

Current applications of the invention include detailed mechanistic and kinetic studies of ultrafast processes in chemical and semiconductor systems. Knowledge about rapid energy flow in reactive intermediates of many chemical and biological systems will further our understanding of how chemical reactions occur, what the intermediate species and mechanistic steps in a reaction are, and how energy flow in chemical systems influences the creation of new chemical products. The method should also reveal the structure and energy content of intermediate chemical species as they occur.

Another current application is to examine very short-lived low energy electronic states of semiconductors and metals and to study molecules adsorbed on their surfaces. Direct observation of ultrafast phenomena in semiconductor and metal systems would improve our knowledge of electronic, physical and chemical interactions in such materials and lead to the development of faster electronic circuits and components.

The invention may also be applied to directly observe how electrons migrate through superconducting materials.

Detailed studies in molecular biology, such as the involvement of hydrogen-bonding interactions in RNA and DNA reproduction, protein degradation, and drug interactions with cells and cell membranes could be performed more efficiently by using this method. These time-resolved measurement and their interpretation would eventually lead to the development of new methods to design chemical reactions, catalysts, semiconductor devices and even biological systems.

Still other objects and advantages of the present invention will become readily apparent to those skilled in this art from the preceding detailed description, wherein only the preferred embodiments of the invention are illustrated and described, as aforementioned, simply by way of presenting the best modes contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive, the invention being defined solely by the claims appended hereto.

I claim:

1. Apparatus for obtaining spectrographic data with ultrafast time and high spectral resolution, comprising:
   means for generating a visible pulse output at a predetermined narrowband high frequency;
   means for receiving a portion of said pulse output and generating a corresponding tunable broadband visible output;
   means for orthogonally polarizing, collimating and combining said visible pulse and said broadband output to generate a broadband infrared (BBIR) probing pulse;
   means for beamsplitting said probing pulse into a polarized infrared output and a visible pulsed output;
   means for transmitting said polarized infrared output to probe a sample, to thereby generate a corresponding broadband infrared signal characterized by said sample; and
   means for overlapping said characterized broadband infrared signal with said visible pulsed output to generate a visible broadband spectral signal providing data relating to the probed sample.

2. Apparatus according to claim 1, wherein:
   said means for generating a visible pulse comprises a picosecond laser source.

3. Apparatus according to claim 1, wherein:
   said means for generating a visible pulse comprises a femtosecond laser source.

4. Apparatus according to claim 1, wherein:
   said means for generating said broadband visible output comprises a pumped dye laser capable of providing single high power broadband visible pulses in the picosecond to femtosecond range.

5. Apparatus according to claim 1, further comprising:
   means for downconverting said combined visible pulse and said broadband output to provide a phasematched broadband infrared output to generate said broadband infrared probing pulse in a nonlinear crystal.

6. Apparatus according to claim 1, wherein:
   said means for beamsplitting said probing pulse comprises a silicon wafer.

7. Apparatus according to claim 1, wherein:
   said means for transmitting transmits said polarized infrared output through a sample to thereby generate said corresponding broadband infrared signal.

8. Apparatus according to claim 1, wherein:
   said means for transmitting transmits said polarized infrared output and reflects the same from a sample to thereby generate said corresponding broadband infrared signal.

9. Apparatus according to claim 1, wherein:
   said means for overlapping said characterized signal with said visible pulse comprises a second silicon wafer and a nonlinear crystal sum frequency generator to generate the broadband visible spectral signal.

10. Apparatus according to claim 1, further comprising:
    means for processing said visible spectral signal into spectrographic data characterizing said probed sample.

11. Apparatus for obtaining spectrographic data with ultrafast time and high spectral resolution, comprising:
    a laser beam source for generating a visible pulse output at a predetermined narrowband high frequency in the picosecond to femtosecond range;

a pumped dye laser source adapted to receive a portion of said visible pulse output and for generating a broadband output comprising single high power broadband visible pulses in the picosecond to femtosecond range;

means for orthogonally polarizing, collimating and overlapping said visible pulse output and said broadband output to provide a phasematched broadband infrared output to generate a probing pulse;

a beamsplitter for beamsplitting said probing pulse into a polarized, infrared output and a visible pulsed output;

means for focusing and reflecting said polarized infrared output to a sample to thereby generate a corresponding broadband infrared signal characterized by said sample;

a linear sum frequency generator for converting the characterized signal into a visible broadband spectral signal; and means for processing said visible spectral signal into spectrographic data characterizing the probed sample signal.

12. A method for obtaining broadband multichannel infrared spectra with resolution in the picosecond to femtosecond range of time resolution, comprising the steps of:

generating a pulse output in the visible spectrum at a predetermined narrowband high-pulse frequency;

receiving a portion of said pulse output and generating a tunable broadband output therefrom;

orthogonally polarizing and collimating said pulse output and said broadband output to generate a focused broadband infrared (BBIR) probing pulse;

downconverting and beamsplitting said probing pulse into a polarized infrared output and a visible pulsed output;

transmitting said polarized broadband infrared output to probe a sample and focusing a resultant corresponding broadband signal characterized by said sample; and overlapping said characterized infrared signal with said visible pulsed output to generate a visible spectral signal providing data on said probed sample.

13. A method according to claim 12, comprising the further step of:

amplifying and frequency-modulating said pulse output after said step of generating the same and before said step of generating a tunable broadband output therefrom.

14. A method according to claim 12, wherein:

said high pulse frequency of said pulse output is selected to be in the picosecond to femtosecond range.

15. A method according to claim 12, wherein:

said step of transmitting said polarized broadband infrared output to probe a sample includes the step of transmitting said polarized broadband infrared output through said sample for obtaining said resultant corresponding broadband visible signal therefrom.

16. A method according to claim 12, wherein:

said step of transmitting said polarized infrared output to probe a sample comprises the step of reflecting said polarized infrared output from a selected portion of said sample and utilizing a corresponding reflected infrared output to generate said resultant corresponding broadband visible signal characterized by said sample.

17. A method according to claim 16, wherein:

the reflected broadband infrared output containing sample information is upconverted to a visible broadband signal by means of a nonlinear mixing crystal.

18. A method according to claim 12, wherein:

the transmitted broadband infrared output containing sample information is upconverted to a visible broadband signal by means of a nonlinear mixing crystal.

19. A method according to claim 12, comprising the further step of:

receiving said visible spectral signal providing data on said probe sample at a spectrograph for generating a spectral analysis output thereof.

20. A method according to claim 12, comprising the further step of:

processing said visible spectral signal containing sample data repeatedly to thereby generate time averaged data indicative of a condition of said sample.

* * * * *